United States Patent [19]

Fracalossi et al.

[11] Patent Number: 4,621,106
[45] Date of Patent: Nov. 4, 1986

[54] POLYESTER POLYURETHANE FOAMS HAVING ANTISTATIC PROPERTIES

[75] Inventors: Roland N. Fracalossi; Walter V. V. Greenhouse, both of Baltimore; Joseph S. Sollers, Lutherville, all of Md.

[73] Assignee: Wm. T. Burnett & Co., Inc., Baltimore, Md.

[21] Appl. No.: 698,535

[22] Filed: Feb. 5, 1985

[51] Int. Cl.$^4$ .................. C08G 18/14; C08G 18/34
[52] U.S. Cl. ........................... 521/130; 252/500; 252/511; 521/123; 521/99
[58] Field of Search .................. 521/130, 123

[56] References Cited

U.S. PATENT DOCUMENTS 3,129,191  4/1964  Nickerson et al. ............ 521/123
3,640,920  2/1972  Cear ........................... 521/123
4,123,599  10/1978 Hilterhaus et al. ............ 521/137
4,231,901  11/1980 Berbeco ....................... 521/137
4,438,221  3/1984  Fracalossi et al. ............ 521/130
4,482,513  11/1984 Auletti ........................ 521/123

Primary Examiner—Herbert S. Cockeram
Attorney, Agent, or Firm—A. W. Breiner

[57] ABSTRACT

An antistatic polyester polyurethane foam containing substantially uniformly incorporated therein as an antistatic material a combination of a particulate, electrically conductive material, such as carbon black, and a haloacetic acid, such as dichloroacetic acid. The combination of conductive material and haloacetic acid which is incorporated into the polyurethane foam during its in situ preparation is believed to be tied into the foam through reaction of the haloacetic acid and at least the diisocyanate used in the foam formulation. The polyurethane foams of this invention have excellent antistatic properties while retaining the desirable features of a good polyurethane foam including uniformity of cell size, no pinholing, and good structural stability.

16 Claims, No Drawings

POLYESTER POLYURETHANE FOAMS HAVING ANTISTATIC PROPERTIES

FIELD OF INVENTION

The present invention relates to polyurethane foams having antistatic properties and to the method of preparing such foams. More particularly, the invention relates to polyester polyurethane foams having as an antistatic agent a combination of particulate, electrically conductive material and a haloacetic acid, such as dichloroacetic acid.

BACKGROUND AND PRIOR ART

It is recognized that many electronic devices and/or parts therefor, generically referred to herein as electronic components, are extremely sensitive to jarring or vibration during shipping of the components to end users or in simply transporting the components from one department to another during the manufacturing process. Due to this sensitivity to jarring and vibration, foams including polyurethane foams have been suggested and utilized as packaging materials as well as a jar or vibrational dampener in transporting electronic components from one position or location to another during their manufacture. It was soon determined, however, that such foams including polyurethane foams by being in contact with electronic components through sliding, rubbing or separation of materials, or simply being in contact with plant personnel or in a plant environment will build up a static electrical charge sufficient to cause arcing and consequent damage to electronic components. To alleviate the problem caused by this build-up of static electricity, efforts have been made to produce foams which have antistatic properties as exemplified by U.S. Pat. No. 4,231,901. U.S. Pat. No. 4,231,901 discloses electrically conductive foams adapted for use with electronic components sensitive to static charges. These foams have a conductive material such as carbon black impregnated into the foam and bonded thereto with a film-forming polymeric material. Suitable film-forming polymeric materials include elastomeric polymers such as the butadiene-styrene resins as well as the acrylic polymers and the like. As is apparent, the process of producing the antistatic foams is a multi-step process requiring the uniform dispersion or impregnation of the foam with first the conductive material and then bonding with the polymeric binding agent. U.S. Pat. No. 3,933,697 also discloses an antistatic polyurethane foam. According to U.S. Pat. No. 3,933,697, select quaternary ammonium salts are incorporated into a polyurethane foam either by impregnation of a pre-made foam or by including the quaternary ammonium compound in the foam-forming composition when the foam is produced. As seen from the '697 patent, the amount of quaternary ammonium compound which can be incorporated into the foam without detriment to the desired foam properties must be carefully controlled.

Although the aforesaid prior art provides antistatic foams which are useful, antistatic polyester polyurethane foams are still essential which have good foam properties including uniform cell size, freedom from pinholing, good structural stability and strength, and superior flame lamination characteristics, including the ability to retain the antistatic agents during use while still being economical to produce.

PRIMARY OBJECTS AND GENERAL DESCRIPTION OF INVENTION

Accordingly, it is the primary object of the present invention to provide a polyurethane foam having antistatic properties wherein an antistatic material is substantially uniformly distributed in and bonded to the polyurethane foam.

It is another primary object of the present invention to provide a method of producing a polyurethane foam having antistatic properties wherein an antistatic material is substantially uniformly distributed in and bonded to the polyurethane foam during the production of the foam.

The above and other objects of the present invention are accomplished by providing a polyurethane foam composition comprising a polyester polyol; a polyisocyanate; a particulate, electrically conductive material, and a haloacetic acid; distributing the particulate, electrically conductive material and haloacetic acid uniformly within the foam composition, and thereafter foaming the composition. During the foaming reaction of the foam-forming components, the haloacetic acid will react with the diisocyanate so as to become bonded to the foam, and the conductive particulate material is bonded in place by absorption into the polyurethane foam polymer. Foams produced by this invention have excellent characteristics including controlled conductivity. Further, the cell size of the foam can be controlled to provide either a fine cell, nonclickable foam or a coarse cell, clickable foam. The foam as produced is free of any substantial pinholing or other detrimental characteristics often associated with the incorporation of a foreign material into the foam composition during the in situ preparation of the foam. It has also been found that the density of the foam and other foam characteristic can be varied as in a conventional foam which does not include an antistatic agent. Thus, foams can be provided having a density of from as low as about 1.5 up to about 8 pounds per cubic foot, with the softness or firmness of the foam also being modified.

The particulate, electrically conductive material employed in foams made in accordance with the present invention include finely divided metal particles such as silver, copper, and aluminum, electrically conductive carbon black particles or other electrically conductive carbon particles, electrically conductive graphite fibers, and other electrically conductive materials which are inert to the foam formulation, alone or in combination. The amount of particulate material in combination with the haloacetic acid must be sufficient to obtain the desired antistatic or electrically conductive properties which generally must be less than about $1 \times 10^{12}$ ohms/square and preferably less than about $1 \times 10^{11}$ ohms/square of surface resistance. Typically the amount of conductive material will range from about 0.3% to 40% by weight based on the weight of the ester polyol used in the foam, preferably from about 0.5% to 20%, and optimally from about 0.6% to 10%. The particle size of the electrically conductive materials which can be employed can vary, but in the preferred embodiment finely divided carbon particles, such as carbon black, having a particle size of less than 40 millimicrons, and typically from 25 to 35 millimicrons, and a nitrogen surface area ranging from 100 to 1200 square meters per gram are utilized. Suitable electrically conductive carbons are available from the Cabot Corporation, Special Blacks Division, Boston, Mass.; and from Borden Chemical Company, Columbus, Ohio. Preferably the carbon blacks are utilized as aqueous dispersions.

The haloacetic acid which is to be used herein will have the formula $X_nCH_{3-n}COOH$ wherein X is F, CL, Br or I; and n is the whole number 1, 2, or 3. Of the haloacetic acids, dichloroacetic acid having the formula $Cl_2CHCOOH$ has a boiling point of 194.4° C. and a melting point of 9.7° C. and, accordingly, is a liquid at room temperature, is preferred. The haloacetic acids are soluble in water, ethyl alcohol, and ether. The haloacetic acid will be present in the foam formulation in an amount of from about 0.5 to 5% by weight based on the ester polyol, preferably at from about 0.8 to 2.0%, and optimally from about 1.0 to 1.5%.

The polyurethane foam compositions suitable for use according to the present invention are the compositions suitable for making a flexible foam and contain hydroxyl terminated polyester polyols reactive with organic polyisocyanates in the presence of suitable catalysts, surfactants, and blowing agents. The diisocyanates which are to be employed in accordance with the present invention are those commonly employed in preparing polyurethane foams and include compounds having the general formula $R-(NCX)_z$, where X may be oxygen or sulfur, z an integer of one or more, and R an organic radical. These isocyanates, therefore, may be either aromatic or aliphatic, or mixed aromatic-aliphatic products. Although it is necessary to have more than 50 percent of z in these reactions equal to at least two to promote polymerization, monofunctional compounds are often desirable to modify the product. Preferred isocyanates are toluene 2,4 diisocyanate, toluene 2,6 diisocyanate, methylene bis(4-phenyl-isocyanate), 3,3'bitoluene 4,4'diisocyanate, hexamethylenediisocyanate, and octyldecylisocyanate. This preference is based on the commercial availability of such compounds. However, ethylene diisocyanate, trimethylene diisocyanate, tetramethylene diisocyanate, decamethylene diisocyanate, heptylidene diisocyanate, and the corresponding diisothiocyanates; cycloalkylene diisocyanates and diisothiocyanates, e.g., cyclopentylene diisocyanate, cyclohexylene diisocyanate; aromatic diisocyanates and diisothiocyanates, e.g., m-phenylene diisocyanate, naphthalene diisocyanate, and diphenyl-4,4'-diisocyanate; aliphaticaromatic diisocyanates and diisothiocyanates, e.g., xylene-1,4-diisocyanate and 4,4'-diphenylenemethane diisocyanate; heterocyclic diisocyanates and diisothiocyanates, such as $SCNCH_2OCH_2NCS$ and $SCN(CH_2)_3-S-(CH_2)_3NCS$; the isocyanates and isothiocyanates containing more than two functional groups, e.g., benzene 1,2,4-triisothiocyanate, 1,2,2-triisocyanatobutane, toluene triisocyanate; and as modifiers, the monoisocyanates and monothioisocyanates, e.g., octylisocyanate and octadecylisocyanate, can be selected.

The polyester polyols for use herein are the conventionally employed polyester polyols for forming flexible polyurethane foams, i.e., polyester polyols which are reactive with a diisocyanate under the conditions of the foam-forming reaction in the presence of the various conventional foaming catalysts, surfactants, antioxidants, and the like. The range of molecular weights and range of hydroxyl numbers on the reactive polyols must be consistent with the production of flexible foams. The molecular weight is conventionally from about 1500 up to about 5000. The hydroxyl number range is from about 20 to about 130, and preferably from about 25 to about 100. It is possible in order to impart special characteristics to the foam, such as through crosslinking, to use in minor amount a polyol having a hydroxyl number of up to 500 and higher. The ability to use any of the conventional polyester polyols is surprising since it has been found that polyether polyols cannot be satisfactorily utilized in making antistatic foams where a combination of particulate, electrically conductive material and a haloacetic acid is utilized. The polyether polyols provide weaker foams with poor antistatic characteristics.

As is known in the art, a flexible polyurethane foam can be produced by adjusting the polyester polyol and diisocyanate to each other and/or in the presence of low molecular weight crosslinking or curing agents. Additionally, the flexibility characteristics of a polyurethane foam can be modified by using the isocyanate in less than its stoichiometric amount. These flexible foams can have varying degrees of firmness determined by the density characteristics of the foams. It is also possible to include blowing agents such as the Freons or the like to enhance the foaming operation. Since the various materials used are well known to those skilled in the art of polyurethane foams, they will not be described in detail.

It has been found that flame retardant agents can be incorporated into the foam during the manufacture of the foam without adversely influencing the antistatic properties of the foam. Flame retarding agents that can be used are those known in the art for polyurethane foams and include organic and inorganic compounds that contain varying percentages of chlorine and/or bromine, phosphorus, combinations of halogen and phosphorus, and substances such as antimony oxide, hydrated alumina, and compounds containing boron. Surprisingly, it has been found that the halogenated flame retardants, particularly the haloalkyl phosphorus based esters, enhance the antistatic properties of polyester foams made in accordance with the present invention.

Further, it has been found that the antistatic foams of this invention do not cause corrosion when tested for cushioning material in accordance with the corrosivity requirements for packaging as given in Federal Specification PPP-B-1672C. This specification uses the Federal Test Method Standard 101, Method 3005, to determine the Contact Corrosivity of Solid Materials in Flexible, Rigid, or Granular Forms.

To more fully illustrate the present invention, preferred embodiments of the invention will be set forth. These embodiments will establish that the conductive materials and haloacetic acid, particularly dichloroacetic acid, do not detract from the foam characteristics of a good polyester polyurethane foam while imparting good antistatic characteristics to the foam. It is to be understood, however, that the examples are illustrative only and are not set forth as being limiting. Parts are by weight throughout unless otherwise designated.

EXAMPLE 1

A foam-forming composition was made by uniformly mixing in a mixing head 97.9 parts polyester resin F-76 marketed by Witco Chemical Corporation, Chicago, Ill., which is a glycol adipate ester having a hydroxyl number of approximately 60 and a molecular weight of from about 2000 to 2500; 2.1 parts polyester resin YA21-1 marketed by Witco which is a glycol adipate ester having a hydroxyl number of approximately 412; 43.05 parts toluene diisocyanate (Index=80); 1.50 parts N-ethylmorpholine (NEM); 1.55 parts dimethylcetylamine; 0.30 parts Fomrez 1058 marketed by Witco which is a cell opener based on diethyl ammonium oleate; 1.50 parts M6682A, an organic sulfonated ester surfactant marketed by Witco; 4.50 parts carbon black suspension containing 15% carbon in water marketed under the tradename Aquablack 305 by the Borden Chemical Company with 1.20 parts dichloroacetic acid, with water being added to bring the total water content to 4.30 parts. The uniformly blended composition was applied to a foaming surface to provide a foam upon foaming and curing which was nonclickable and having approximately 60 cells per linear inch and a density of approximately 1.7 pounds per cubic foot. After the curing was complete, two samples of the foam were tested at 15% relative humidity to determine their effective surface resistance utilizing ASTM test method D257-78. The foam samples had an average effective surface resistance of $2.4 \times 10^{11}$ ohms/square. The foam samples were also tested to determine static decay of the foam, i.e., the ability of the foam, when grounded, to dissipate a charge induced on the surface of the material. Using Federal Test Method Standard No. 101C, Method 4046.1, the time of charging voltage decay from 5000 volts to 500 volts was an average of 0.65 seconds.

EXAMPLE 2

A foam-forming composition was made by uniformly mixing in a mixing head 94.9 parts polyester resin F-76 as defined in Example 1; 5.9 parts polyester resin YA21-1 as defined in Example 1; 43.10 parts toluene diisocyanate (Index=80); 1.50 parts N-ethylmorpholine (NEM); 0.70 parts dimethylcetylamine; 0.30 parts Fomrez 1058; 1.50 parts M6682A organic surfactant; 4.50 parts conductive carbon black suspension Aquablack 305; 1.20 parts dichloroacetic acid, with water being added to bring the total water content to 4.30 parts. The composition upon foaming and curing provided a clickable foam having a uniform density of 2 pounds per cubic foot, a coarse cell size, approximately 40 cells per inch. Two samples of the foam were tested for surface resistivity and decay time as defined in Example 1. The samples had an average effective surface resistance of $5.8 \times 10^{11}$ ohms/square and an average decay time of 1.45 seconds.

EXAMPLE 3

A foam-forming composition was made substantially as set forth in Example 2 except that the toluene diisocyanate was used in an amount of 49.04 parts, with the total water content being 4.80 parts. Additionally, the foam composition had uniformly mixed therein 15 parts tri(dichloropropyl)-phosphate; 5 parts tri(chloroethyl)-phosphate, and 5 parts powdered cornstarch as flame retardant materials. The foam composition upon foaming and curing provided a clickable foam having a cell size of approximately 40 cells per linear inch, and a density of approximately 2 pounds per cubic foot. Two samples of the foam were tested for effective surface resistivity and decay time as defined in Example 1. The average effective surface resistance was $0.57 \times 10^{11}$ ohms/square and an average decay time of less than 0.25 seconds.

EXAMPLE 4

A foam-forming composition was made by uniformly mixing in a mixing head the same composition as utilized in Example 3 but having added thereto 8.7 parts 85% pentabromodiphenyloxide in phosphate ester plasticizer. The phosphate ester plasticizer is a flame retardant material. The foam obtained was substantially similar in physical characteristics to the foam obtained in Example 3. The effective surface resistivity and decay time were measured on two samples using the procedures defined in Example 1 to obtain an average effective surface resistance of $0.53 \times 10^{11}$ ohms/square and an average decay time of less than 0.25 seconds.

From the aforesaid examples it is established that the combination of electrically conductive material and haloacetic acid provides excellent antistatic characteristics. As is seen from Examples 3 and 4, the presence of halogenated flame retardants improves the antistatic characteristics. It has also been determined that a foam which is relatively hydrophilic will have better antistatic characteristics than a more hydrophobic foam. Accordingly, as a rule of thumb, the lower the toluene diisocyanate index the better the antistatic characteristics.

In the above examples the dichloroacetic acid can be replaced with chloroacetic acids substituted with bromine, chlorine, iodine, or fluorine. It has been determined, however, that dichloroacetic acid is the preferred material from the standpoint of antistatic characteristics imparted and from the standpoint of convenience of use.

As will be apparent to one skilled in the art, various modifications can be made within the scope of the aforesaid description. Such modifications being within the ability of one skilled in the art form a part of the present invention and are embraced by the appended claims.

It is claimed:

1. A flexible polyurethane foam comprising the foam-forming reaction product of water as a foaming agent, an isocyanate reactive polyester polyol and a polyisocyanate, and including uniformly contained in said foam an antistatic agent essentially consisting of the combination of a particulate electrically conductive material and a haloacetic acid, said water being present in an amount sufficient to provide a flexible foam, and said antistatic agent being present in an amount sufficient to provide antistatic characteristics to said foam.

2. The flexible polyurethane foam of claim 1 wherein said haloacetic acid is dichloroacetic acid.

3. The flexible polyurethane foam of claim 2 wherein said conductive material is carbon black.

4. The flexible polyurethane foam of claim 2 wherein said electrically conductive material is present in an amount of from about 0.3 to 40% by weight based on the total weight of said polyol and said dichloroacetic acid is present in an amount of from 0.5 to 5% by weight based on the total weight of said polyol.

5. The flexible polyurethane foam of claim 2 wherein said electrically conductive material is present in an amount of from about 0.5 to 20% by weight based on the total weight of said polyol and said dichloroacetic acid is present in an amount of from 0.8 to 2.0% by weight based on the total weight of said polyol.

6. The flexible polyurethane foam of claim 2 wherein said electrically conductive material is present in an amount of from about 0.5 to 20% by weight based on the total weight of said polyol and said dichloroacetic acid is present in an amount of from 1.0 to 1.5% by weight based on the total weight of said polyol.

7. The flexible polyurethane foam of claim 4 wherein said foam has an effective surface resistance of less than $1 \times 10^{12}$ ohms/square.

8. The flexible polyurethane foam of claim 7 wherein said foam has an effective surface resistance of less than $1 \times 10^{11}$ ohms/square.

9. The method of forming an antistatic flexible polyurethane foam comprising admixing a foam-forming composition including water as a foaming agent, a reactive polyester polyol, a polyisocyanate, and an antistatic agent essentially consisting of a combination of a particulate electrically conductive material and haloacetic acid; subjecting said foaming composition to foaming conditions to form a flexible polyurethane foam having said combination of antistatic agents uniformly contained in said foam, said water being present in an amount sufficient to form a flexible foam and said antistatic agent being present in an amount sufficient to provide antistatic characteristics to said foam.

10. The method of claim 9 wherein said haloacetic acid is dichloroacetic acid.

11. The method of claim 10 wherein said conductive material is carbon black added as an aqueous dispersion.

12. The method of claim 10 wherein said conductive material is present in an amount of from about 0.3 to 40% by weight based on the total weight of said foam, and said dichloroacetic acid is present in an amount of from 0.5 to 5% by weight based on the total weight of the foam.

13. The method of claim 10 wherein said electrically conductive material is present in an amount of from about 0.5 to 20% by weight based on the total weight of said polyol and said dichloroacetic acid is present in an amount of from 0.8 to 2.0% by weight based on the total weight of said polyol.

14. The method of claim 9 wherein said electrically conductive material is present in an amount of from about 0.5 to 20% by weight based on the total weight of said polyol and said dichloroacetic acid is present in an amount of from 1.0 to 1.5% by weight based on the total weight of said polyol.

15. The method of claim 12 wherein said foam has an effective surface resistance of less than $1 \times 10^{12}$ ohms/square.

16. The method of claim 15 wherein said foam has an effective surface resistance of less than $1 \times 10^{11}$ ohms/square.

* * * * *